United States Patent Office 2,756,149
Patented July 24, 1956

2,756,149

MORDANTING BASIC DYES IN PHOTOGRAPHY

Vernon I. Saunders, Ilmari F. Salminen, and Wilho M. Salminen, Rochester, N. Y., assignors to Eastman Kodak Company, Rochester, N. Y., a corporation of New Jersey No Drawing. Application December 17, 1954, Serial No. 476,066

19 Claims. (Cl. 95—8)

This invention relates to the mordanting of basic dyes in hydrophilic organic colloid layers of photographic elements.

Various methods have been employed in photography for the mordanting of basic dyes in hydrophilic organic colloid layers of photographic elements. Inorganic mordants such as phosphotungstic acid and phosphomolybdic acid have been recommended for this purpose as have been organic materials such as carboxylated and sulfonated polymers. Such mordants have limited utility. For example, the mentioned inorganic mordants are useful in processes where it is desired to permanently fix the dyes in the colloid layer but in those cases, as in antihalation and filter layers of photographic films, where it is desirable to bleach the dye from the film during processing, such inorganic mordants render many of the basic dyes nonbleachable in the processing solutions. This is particularly true of the benzoxazole-pyrrole-methine filter dyes. Similarly, the known sulfonated and carboxylated organic mordants have found limited utility in mordanting basic dyes inasmuch as the lower molecular weight sulfonated and carboxylated compounds do not impart the desired non-diffusing properties to the dyes, or in the case of the sulfonated and carboxylated polymers it is virtually impossible if not impractical to use the polymers in organic colloid layers such as gelatin partly because of the high viscosity characteristics of the polymers or the incompatibility of the polymers with the colloid vehicle of the layer. An undesirable feature of the low molecular weight sulfonated compounds such as the sulfonated naphthalene compounds is that while they readily precipitate the basic dyes in organic colloid layers, the addition of these mordants do not improve the stability of the dyes when they are subjected to adverse conditions of temperature and humidity. This is particularly true of the benzoxazole-pyrrole-methine dyes. For example, the compound 5-phenylcarbamyl-1,3-benzene sodium disulfonate precipitates the benzoxazole-pyrrolemethine dyes described hereinafter in gelatin layers; however, the mordanted dyes are decolorized completely upon moderate heating in the presence of moisture. Similar results can be expected with other basic dyes mordanted with such sulfonated compounds.

We have discovered a class of sulfonated and carboxylated organic compounds which, when employed as mordants for basic dyes, greatly improve the stability of the dyes in organic colloid layers such as gelatin, polyvinyl alcohol, hydrolyzed cellulose ester, etc. Moreover, the compounds do not interfere with the bleaching properties of the dyes in photographic processes.

The sulfonated and carboxylated mordant compounds of the invention have the following general structure:

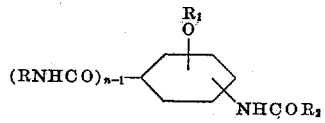

wherein $n$ is a positive integer of from 1 to 2, R and $R_1$ each represent monocyclic aryl groups of the benzene series, one or both of which contain one or more alkyl groups of at least four carbon atoms such as n-butyl, n-amyl, t-amyl, n-hexyl, lauryl and cetyl. $R_2$ represents either a monocyclic sulfoaryl or carboxyaryl group of the benzene series, such as mono or disodium sulfophenyl or mono or disodium carboxyphenyl groups.

The following compounds are illustrative of the mordants having the above general formula which are useful in our invention. It will be apparent from the description hereinafter that while the mordant compounds are illustrated in the form of the acid chlorides or esters they are used in the form of their water-soluble salts such as their alkali metal or ammonium salts obtained by hydrolysis of the acid halides and esters in a well-known manner.

I
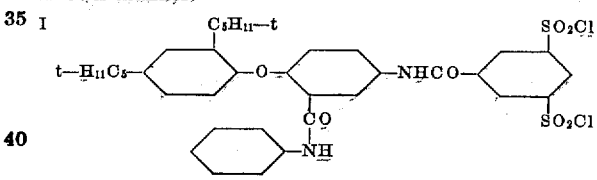

5-[4-(2,4-di-tert-amylphenoxy)-3-(phenylcarbamyl)phenyl-carbamyl]-1,3-benzenedisulfonyl chloride II
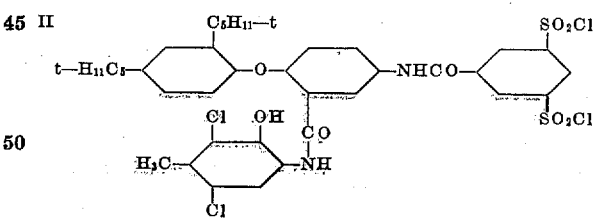

2,4-dichloro-3-methyl-6-[2'-(2'',4''-diamylphenoxy)-5-(3'',5''-dichlorosulfonyl)-benzamido]-benzamidophenol III
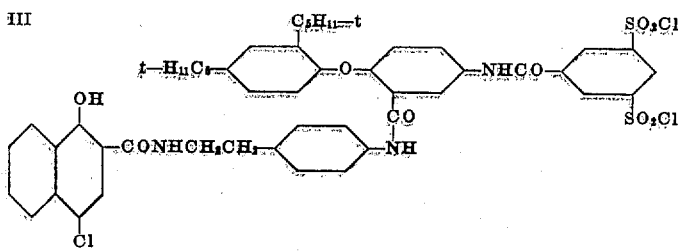

1-hydroxy-4-chloro-N-(4-(2-(2,4-diamylphenoxy)-5-(3,5-disodium-sulfobenzamido)-benzamido)-phenethyl)-2-naphthamide IV
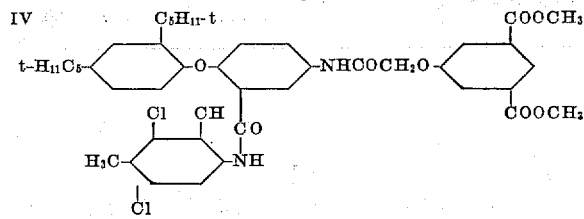

6-[2-(2,4-di-tert-amylphenoxy)-5-α-(3,5-dicarbomethoxyphenoxy-acetamido)benzamido]-2,4-dichloro-3-methylphenol V
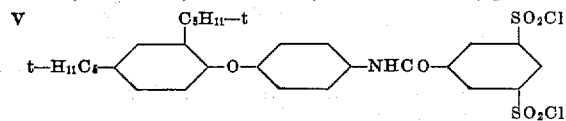

5-[4-(2,4-di-tert-amylphenoxy)phenylcarbamyl]-1,3-benzenedisulfonyl chloride

VI
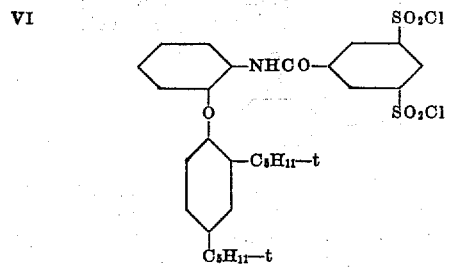

5-[2-(2,4-di-tert-amylphenoxy)phenylcarbamyl]-1,3-benzenedisulfonyl chloride

VII
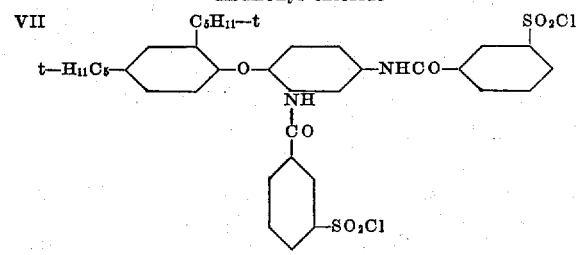

4-(2,4-di-tert-amylphenoxy)-1,3-phenylene-bis-(3-carbamyl-benzenesulfonyl chloride)

VIII
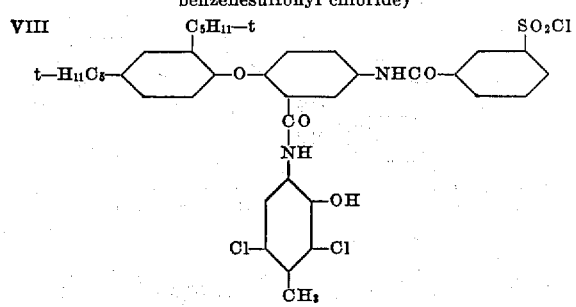

6-[5-(m-Chlorosulfonylbenzamido)-2-(2,4-di-tert-amylphenoxy)-benzamido]-2,4-dichloro-3-methylphenol Compound I, 5-[4-(2,4-di-tert-amylphenoxy)-3-(phenylcarbamyl) phenylcarbamyl] - 1,3 - benzenedisulfonyl chloride, was prepared as follows:

2-(2',4'-DIAMYLPHENOXY)-5-NITROBENZOIC ACID

In a 5-l. 3-necked flask equipped with stirrer and thermometer are placed 858 g. (3.66 moles) of 2,4-t. diamylphenol and 216 g. (3.84 moles) of potassium hydroxide pellets. The mixture is heated with stirring until the temperature reaches 130°; it is then allowed to cool to 110°, and 302 g. (1.5 moles) of 2-chloro-5-nitrobenzoic acid is added. The thick mixture is stirred and heated until the temperature reaches 125°, whereupon a spontaneous reaction takes place and the temperature rises to 145°. The slurry becomes much more fluid and the steam from the reaction is allowed to escape through the open neck of the flask. The reaction mixture is heated with stirring for 1½ hrs. at 140–150°. The melt is then stirred into 4.5 l. of benzene. When the melt has been well digested, the suspension of yellow solid is filtered off and discarded.

The dark brown liquid is placed in a 12-l. flask; the solution is stirred very vigorously with 3 l. of water and 600 cc. of concentrated hydrochloric acid. The aqueous layer is removed and the benzene layer is washed with 1 l. of hot water. The benzene solution is concentrated to about 2.5 l.; it is cooled to 10° for several hours or overnight. Crude 2-(2',4'-diamylphenoxy)-5-nitrobenzoic acid is filtered, washed on the funnel with 700 cc. of benzene, followed by 700 cc. of petroleum ether (950), and dried at 100°. The yield is 350–365 g. (58–61%); it melts at 182–185° with sintering at 175°.

For purification, 350 g. of the above acid is dissolved in 4 l. of hot ethyl alcohol and the product is allowed to crystallize overnight. The crystalline cake is broken up, filtered, washed with 500 cc. of ethyl alcohol and dried at 100°. The yield is 264 g. (75% recovery); it melts at 186–188°, with sintering at 180°.

This acid is again recrystallized from 2.75 l. of alcohol. The recovery is 204 g. (77.7%) (34.8 overall yield): it melts at 189–191°, with sintering at 185°.

2-(2',4'-DIAMYPHENOXY)-5-NITROBENZOYL CHLORIDE

In a 2-l. round-bottomed tared flask, equipped with an air reflux condenser are placed 200 g. (0.5 mole) of 2-(2',4'-diamylphenoxy)-5-nitrobenzoic acid and 800 cc. of thionyl chloride (distilled over quinoline). The flask is heated in a waterbath at 45° for 2 hrs. After about 15–20 minutes the solid dissolved completely and evolution of gas proceeds briskly. The reaction mixture is allowed to stand overnight at room temperature. The excess thionyl chloride is removed at the water pump while heating on the steam bath. A viscous, honey-colored, highly refractive liquid remains. Heating is continued for 1½ hrs. under reduced pressure (10 mm./Hg). The viscous acid chloride is now transferred to an 8-in. evaporating dish (warming the inverted flask with a soft flame to facilitate the flow of liquid). The evaporating dish is placed in a vacuum desiccator. After one day the surface of the acid chloride solidifies; the mass is stirred and is allowed to stand in the vacuum desiccator until completely solid (two days). The solid is removed from the evaporating dish and pulverized in a mortar. The final product is a cream-colored, friable powder, of M. P. 62–64°. The yield is 200 g. (98%).

2-(2,4-DI-TERT-AMYLPHENOXY)-5-NITROBENZANILIDE

To a solution of 2 parts of 2-(2,4-di-tert-amylphenoxy)-5-nitrobenzoyl chloride in 10 volumes of xylene was added a solution of 1 part of aniline in 2.5 volumes of xylene at 25° C. with stirring. The temperature rose rapidly to 44° C. and a white solid separated. The mixture was left at room temperature overnight, after which time the aniline hydrochloride was filtered off and the filtrate was concentrated in vacuo. The residual oil crystallized after standing at room temperature for 2 hours. The product was recrystallized from ligroin, collected and dried.

5-AMINO-2-(2,4-DI-TERT-AMYLPHENOXY) BENZANILIDE

In a 500 cc. low pressure reduction bottle was placed a solution of 10 parts of 2-(2,4-di-tert-amylphenoxy)-5-nitrobenzanilide in 100 volumes of ethyl acetate. To this solution was added one part of Raney nickel catalyst, and the bottle was placed on the Parr hydrogenation shaker. The hydrogen pressure was brought to 50 lb. and the reduction was run in approximately 2 hours during which time the theoretical amount of hydrogen was absorbed. The reaction mixture was removed and filtered immediately and the filtrate concentrated in vacuo. The residual oil was dissolved in 40 volumes of ethyl alcohol and a solid product separated. This product was collected and dried.

5-[4-(2,4-DI-TERT-AMYLPHENOXY)-3 - (PHENYL-CARBAMYL) PHENYLCARBAMYL] - 1,3 - BENZENEDISULFONYL CHLORIDE

To a solution of 2.2 parts of 5-amino-2-(2,4-di-tert-amylphenoxy) benzanilide and one part of sodium acetate in 20 volumes of glacial acetic acid was added a partial solution of 1.9 parts of 3,5-dichlorosulfonylbenzoyl chloride in 30 volumes of glacial acetic acid with stirring at 22° C. The temperature rose rapidly to 32° C. and a complete solution resulted. In approximately 2 minutes a white solid separated from the reaction mixture. This mixture was left standing at room temperature for 6 hours after which time it was diluted with 10 volumes of water. The product was collected and dried.

Compound II, 2,4 - dichloro - 3 - methyl-6-[2'-(2'',4''-diamylphenoxy)-5-(3'',5''-dichlorosulfonyl)- benzamido]-benzamido-phenol, was prepared as follows:

2-AMINO-4,6-DICHLORO-5-METHYL PHENOL HYDROCHLORIDE

In a 1-l. beaker was placed 100 g. (0.634 mole) of 2-amino-4-chloro-5-methylphenol (J. für Prakt. Chem. 91, 414) and 450 cc. of glacial acetic acid, and the mixture was stirred as smooth as possible with a glass rod; the temperature rose from 23 to 35°. To this slurry was added all at once 132 cc. (142 g., 1.4 moles) of acetic anhydride, the temperature now rising to 55°. At no time was a solution formed because the acetyl derivative crystallized almost immediately. This mixture was stirred smooth with a rod and left standing for ½ hour. The slurry was then cooled to 20° and 55 cc. (92 g., 0.68 mole) of practical sulfuryl chloride added all at once. The temperature rose to 46°, a red solution being formed. As soon as solution was complete and before the new chloro compound could crystallize, the liquid was transferred to a 3-l. 3-necked flask provided with a stirrer and reflux condenser. After 10 minutes to the now crystal-containing mixture was added a solution of 500 cc. of ethyl alcohol and 500 cc. concd. hydrochloric acid.

The mixture was boiled while stirring. After 5 minutes at the boil, crystals of hydrochloride began to separate. The mixture was refluxed for 45 minutes after the first appearance of solid. The mixture showed appreciable tendency to foam, especially if boiling was rapid. The mixture was cooled overnight and filtered by suction (brown filtrate). The solid on the filter was washed with ½ l. of acetone, a white hydrochloride being thus obtained. Dried at 70°. Yield: 113 g. (78%).

A sample of free amine liberated by sodium bicarbonate from this hydrochloride melted at 133–134°.

2,4 - DICHLORO-3-METHYL-6-[3'-NITRO-6'-(2'',4''-DI - TERT.- AMYLPHENOXY) - BENZAMIDO]-PHENOL

In a 5-l., 3-necked flask provided with a stirrer and a thermometer is placed 1380 cc. of acetic acid. To it are added 138 g. (1.64 moles) of anhydrous sodium acetate, 138 g. (0.6 mole) of 2-amino-4,6-dichloro-5-methyl phenol hydrochloride and 264 g. (0.63 mole) of 2-(2',4'-di-tert.-amylphenoxy)-5-nitrobenzoyl chloride (prepared above). The heat of reaction raises the temperature about 8° C. The slurry is stirred vigorously for 1 hr. At no time does the solid go completely into solution. The slurry is then washed into a 12-l. flask with 7.5 l. of water and the aqueous solution is filtered on a 37-cm. Lapp table-top funnel. The product is washed on the funnel with 9 l. of ethyl alcohol and dried. The yield is 356 g. (102%); M. P. 194–197°. The product is then recrystallized from 9 l. of 97% acetic acid, filtered through the table-top funnel, washed on the funnel with 900 cc. of acetic acid and two 1800-cc. portions of petroleum ether. The product is air dried. The yield is 302 g. (84%); M. P. 205–207°.

2,4 - DICHLORO-3-METHYL-6-[3'-AMINO-6'-(2'',4''-DIAMYLPHENOXY)-BENZAMIDO]-PHENOL

In a 12-l. flask equipped with a stirrer and reflux condenser are placed 3 l. of 90% acetic acid and 1.5 l. of alcohol; 300 g. (0.52 mole) of 2,4-dichloro-3-methyl-6-[3'-nitro-6'-(2'',4'' - diamylphenoxy) - benzamido]-phenol is added to the acid-alcohol solution with stirring to prevent cake formation. This compound does not go into solution completely even under reflux conditions. The flask and its contents are heated to boiling over a gas ring. When reflux conditions are reached the flame is extinguished and 300 g. (5.4 moles) of powdered iron metal is added all at once. The reaction is quite vigorous. The reflux condenser is replaced immediately after the iron addition. The solution is refluxed for 10 min. The hot solution is filtered rapidly with vacuum through a 12-in. Büchner funnel into a 22-l. flask to remove the excess iron oxides formed. To the filtrate is added with stirring 8–9 l. of water. The amine is precipitated out and filtered off on a 37-cm. Lapp table-top funnel and washed on the funnel with 4–5 l. of water. The product is sucked as dry as possible and dissolved in 3 l. of ethyl ether. Residual water is removed in a large separatory funnel and the ether solution dried over 300 g. of Drierite. The other solution is concentrated to dryness under reduced pressure and the crude amine which results is dissolved in 1.2 l. of hot toluene and to this solution is added 4.2 l. of warm ligroin. The solution is then set aside to crystallize. When crystallization appears complete the solid is filtered off on a 12-in. Büchner funnel, washed with 1 l. of petroleum ether and dried. The yield is 163 g. (58%); M. P. 174–176°.

2,4-DICHLORO - 3 - METHYL-6-[2'-(2'',4''-DIAMYL-PHENOXY) - 5 - (3'',5''-DICHLOROSULFONYL)-BENZAMIDO]-BENZAMIDO-PHENOL

In a 12-l. flask is placed 1500 cc. of 1,4-dioxane. To this is added 163 g. (0.3 mole) of 2,4-dichloro-3-methyl-6-[3'-amino - 6' - (2'',4'' - diamylphenoxy)-benzamido] phenol and 152 g. (0.36 mole) of 3,5-dichlorosulfonyl-benzoyl chloride. The temperature rises about 4° and the solution has a clear orange color. It is allowed to stand for 3 mins. and 42.3 cc. (0.36 mole) of synthetic quinoline is added. The temperature again rises about 5°. The solution is allowed to stand for 20 mins. when a cream-colored precipitate is observed. A solution of 750 cc. of concentrated hydrochloric acid in 7 l. of water is added with stirring to the reaction mixture and a heavy yellow precipitate is formed. This is filtered on a 37-cm. Lapp table-top funnel and washed successively with 7 l. of distilled water, 7 l. of alcohol and 7 l. of ethyl ether. The precipitate is dried. The yield is 240 g. (94%); M. P. 275°.

Compound III, 1-hydroxy-4-chloro-N-(4-(2-(2,4-di-amylphenoxy)-5-(3,5-disodiumsulfobenzamido) - benz-amido)-phenethyl)-2-naphthamide, was prepared analogously to Example 1, U. S. Patent 2,657,134, with phenyl-4-chloro-1-hydroxy-2-naphthoate being substituted for phenyl-1-hydroxy-2-naphthoate in step a and 3,5-dichloro-sulfonylbenzoyl chloride being substituted for 3-sulfo-benzoyl chloride in step e.

Compound IV, 6-[2-(2,4-di-tert-amylphenoxy)-5-α-(3,5 - dicarbomethoxyphenoxyacetamido)benzamido]-2,4-dichloro-3-methylphenol, was prepared as follows:

POTASSIUM 3,5-DICARBOXYBENZENESULFONATE

One hundred sixty-six grams (1 mole) of isophthalic acid and 800 ml. of 60% oleum were mixed in a 2-liter standard-taper three-necked flask equipped with a water-cooled condenser, a mechanical stirrer, and thermometer.

While stirring, the reaction mixture was heated slowly up to 210° and kept there for 10 hours. Much SO₃ is lost through the condenser at the start of the heating, and 8 or 10 hours may be required to arrive at 210° C. Care should be taken that the escaping SO₃ does not solidify on the inside walls of the condenser, thus plugging it and causing an explosion. To avoid this, only a very thin stream of water is circulated through the condenser. The mixture was allowed to cool, was poured into a 3-liter beaker, and diluted slowly with 800 grams of ice. The solution was cooled at 5–10° for 2 hours, and the solid formed was filtered by suction, using a glass cloth as the filtering medium. The solid was dissolved in 1 liter of water, filtered to remove traces of unsulfonated isophthalic acid, if necessary, and treated with a concentrated water solution of potassium chloride (80 grams). A white precipitate forms immediately; it is filtered, washed first with 500 ml. of 3 percent potassium chloride solution, and then with 300 ml. of cold water, and dried in a hot oven. The yield of potassium 3,5-dicarboxybenzenesulfonate was 268 grams or 94.4 percent of the 284 gram theoretical amount.

3,5-DICARBOXYPHENOL

A mixture of 350 grams of potassium hydroxide and 1500 grams of sodium hydroxide contained in a 2-liter steel beaker was heated in an oil bath to a temperature of 225 C. To this mixture was gradually added 300 grams (1.05 mol) of potassium 3,5-dicarboxybenzenesulfonate with hand stirring while maintaining a temperature of 215–235 C. Heating at this temperature was continued for 30 minutes after the addition had been completed. The reaction mixture was stirred almost continuously during the whole reaction time, until near the end when the mixture had become too viscous to stir at all. The reaction mixture was allowed to cool, while being broken up in small pieces with a large nickel spatula. The solid was dissolved in 4 liters of water, and the solution was acidified with concentrated hydrochloric acid, using ice to keep the solution below 100 C. The acid solution was cooled to 10–15 C., and the solid precipitated was filtered and washed with about 1 liter of cold water and dried in a hot oven. The yield of 3,5-dicarboxyphenol was 156 grams, 81.5 percent of the 191-gram theoretical, melting at 294–296 C. The product may be crystallized from boiling water, but is entirely satisfactory for use in the next step. The water-crystallized sample had a melting point of 295–297 C. and gave good analytical results.

3,5-DICHLOROFORMYLPHENOL

In a 1-liter, 3-necked standard-taper flask was mixed 156 grams (.855 mol) of 3,5-dicarboxyphenol and 800 ml. of distilled thionyl chloride. The flask was equipped with a mechanical stirrer and a water-cooled condenser. The mixture was heated at reflux with stirring until complete solution had taken place (about 36 hours). The excess thionyl chloride was distilled off, first under normal pressure and finally under reduced pressure on the steam bath. The product was used in the next step without purification. Yield 187 grams, 100 percent of theory.

3,5-DICARBOMETHOXYPHENOL

The crude acid chloride (187 grams, 0.855 mole), while still warm (to keep it liquid), was added in a thin stream to 1 liter of absolute methyl alcohol. The methyl alcohol had been previously cooled to about 10 C. and was stirred vigorously during the addition of the acid chloride. The reaction mixture became hot, and a brisk evolution of hydrochloric acid gas took place. The reaction mixture was then cooled to 10 C. and the precipitate formed was filtered by suction and dried in a hot oven.

The product was crystallized from 2 liters of dry xylene, thus getting a material melting at 163–5 C. in long white needles. Yield: 138 grams, which is 77 percent of the 179.5 gram theoretical quantity based on the acid used in making the acid chloride.

3,5-DICARBOMETHOXYPHENOXYACETIC ACID

Absolute methyl alcohol, 300 ml., was reacted with 13.8 grams (0.6 mol) of clear sodium in a 1-liter, 3-necked flask equipped with a water-cooled condenser carrying a drying tube and a mechanical stirrer. The third neck was used for the addition of the other reagents. To the sodium methoxide formed was added first 63 grams (0.3 mol) of 3,5-dicarbomethoxyphenol followed by 41.7 grams (0.3 mol) of bromoacetic acid dissolved in 100 ml. of absolute methanol with mechanical stirring.

The reaction mixture was heated at reflux on a steam bath with stirring for 18 hours. The precipitate first formed reacts slowly during the heating giving rise to the formation of a much less flocculent new precipitate. After this time the mixture was cooled, poured into 1 liter of cold water, and acidified with dilute hydrochloric acid. The solid formed was filtered by suction, washed free of acid, and air-dried.

The dry material was crystallized from boiling dry xylene. The product was a white crystalline solid and had a M. P. of 164–5 C.

A mixed sample of starting material and product showed a depression of 25–30°. By partial evaporation of the xylene, mother liquors 5.8 grams of good starting material was recovered. Yield 50 grams, 68.5 percent of the 73-gram theory, based on the recovery of some starting material.

α-(3,5-DICARBOMETHOXYPHENOXY)ACETYL CHLORIDE

A suspension of 26.8 g. (0.1 mole) of α-(3,5-dicarbomethoxyphenoxy)acetic acid in 200 ml. of thionyl chloride was stirred under a reflux condenser at 40–45° until complete solution had taken place. The reaction time was about 14 hours. The excess thionyl chloride was removed under reduced pressure without raising the temperature above 40°. The residue solidified in the flask. It was broken up and used in the next operation without purification. Yield 28.6 g.—100% of theory.

6-[2-(2,4-DI-TERT-AMYLPHENOXY) - 5 - α - (3,5-DI-CARBOMETHOXYPHENOXYACETAMIDO) BENZAMIDO] - 2,4 - DICHLORO - 3 - METHYLPHENOL

A solution of 15.3 g. (0.029 mole) of 6-[3-amino-6-(3,5 - di - tert - amylphenoxy)benzamido]-2,4-dichloro-3-methylphenol (prepared above for II), 8.35 g. (0.029 mole) of α-(3,5-dicarbomethoxyphenoxy)acetyl chloride, 200 ml. of acetone, and 3.6 g. (0.03 mole) of dimethylaniline was refluxed 2 hours on a steam bath. The cooled solution was then poured into 500 ml. of cold water containing 3 ml. of concentrated hydrochloric acid with stirring. The oil formed soon solidified and was filtered, washed well with water, and dried in a hot oven. The dry solid was crystallized from 300 ml. of benzene using Norite to clean the solution. The white solid obtained had a melting point of 151–153° and weighed 19 g., 83% of the 23 g. theory. Further purification seemed to raise the melting point but it also widened the range. The analytical results obtained from this sample follow:

| | Calculated for $C_{42}H_{46}Cl_2N_2O_9$ (793) | Found |
|---|---|---|
| C | 63.5 | 63.8 |
| H | 5.8 | 6.0 |
| Cl | 8.5 | 8.8 |
| N | 3.5 | 3.8 |

Compound V, 5-[4-(2,4-di-tert-amylphenoxy) phenylcarbamyl]-1,3-benzenedisulfonyl chloride, was prepared as follows:

2,4-DI-TERT-AMYL-4'-NITRODIPHENYL ETHER

In a suitable vessel was placed 143 parts of diamylphenol and 18 parts of potassium hydroxide. The mixture was heated until solution resulted, 40 parts of p-chloronitrobenzene was added and the reaction mixture heated at 140–150 C. for several hours.

The melt was drowned in a large volume of water, the insoluble oil removed and distilled fractionally, product being collected at 190–195 C./1 mm.

2,4-DIAMYL-4'-AMINODIPHENYL ETHER

A solution of 53 parts of nitro compound in 150 volumes of alcohol was placed in a conventional hydrogenation apparatus, 1 part of Raney nickel catalyst added, and reduction effected at 50 lb. of hydrogen pressure at ordinary temperature for 2 hours. The amine was filtered free from nickel and the product distilled fractionally at 175–185/1 mm.

5 - [4 - (2,4 - DI - TERT-AMYLPHENOXY) PHENYL-CARBAMYL]-1,3-BENZENEDISULFONYL CHLORIDE

The method of preparation was analogous to that for compound VI below using the isomeric reactants required. M. P. 202–203° C. (Dec.).

Compound VI, 5-[2-(2,4-Di-tert-amylphenoxy) phenyl-carbamyl]-1,3-benzenedisulfonyl chloride, was prepared as follows:

2-(2,4-DI-TERT-AMYLPHENOXY) NITROBENZENE

In a suitable vessel was placed 143 parts of diamylphenol and 18 parts of potassium hydroxide. The mixture was heated until solution resulted, 40 parts of o-chloronitrobenzene was added and the reaction mixture heated at 140–150° C. for several hours.

The melt was drowned in 1000 volumes of 2% sodium hydroxide, extracted with 600 parts of petroleum ether. The ether extract was dried over sodium sulfate, and the solvent removed. The product was purified by distillation at 183–186° C./1 mm.

(2,4-DI-TERT-AMYL)-2'-AMINODIPHENYL ETHER

A solution of 33 parts of nitro compound in 200 volumes of alcohol was placed in a conventional hydrogenation apparatus. One part of Raney nickel catalyst was added and reduction effected at 50 lb. of hydrogen pressure at ordinary temperature for two hours. The amine was filtered free from nickel and the product distilled fractionally at 198–200° C./1 mm.

5 - [2 - (2,4 - DI - TERT-AMYLPHENOXY) PHENYL-CARBAMYL]-1,3-BENZENEDISULFONYL CHLORIDE

Solutions of 2.2 parts sodium acetate in 20 volumes of acetic acid and 6.5 parts of 2-(2,4-di-tert-amylphenoxy) aniline in 10 volumes of acetic acid were mixed. To this mixture was added 7.4 parts of 3,5-dichlorosulfonylbenzoyl chloride. A solid separated from the mixture which was diluted with 6 volumes of water. The product was isolated on the funnel. M. P. 202–203° C. (Dec.).

Compound VII, 4-(2,4 - Di - tert - amylphenoxy) - 1,3-phenylene-bis-(3-carbamylbenzenesulfonyl chloride), was prepared as follows:

4-(2,4-DI-TERT-AMYLPHENOXY)-M-DINITROBENZENE

To 8 parts of 2,4-di-tert-amylphenol was added at 130° C. with stirring 1 part of potassium hydroxide. This mixture was stirred at 150° C. for 2 hours during which time water came off and the potassium salt of the phenol was formed. This green semi-solid mixture was cooled to 60° C. and a solution of 3 parts of 2,4-dinitrochlorobenzene in 3 volumes of 2,4-di-tert-amylphenol was added. The temperature rapidly rose to 95° C. The thin slurry was stirred for ½ hour, then heated to 150° C. for 4 hours and finally left standing at room temperature overnight. The mixture was then poured into a solution of 3 parts of sodium hydroxide in 120 volumes of water.

The product separated as an amber oil which remained as such. The excess diamylphenol was removed by placing the oil in a vacuum at 150° C. The residual amber glass was used without further purification.

4-(2,4-DI-TERT-AMYLPHENOXY)-M-PHENYLENEDIAMINE

In a 500 cc. low pressure reduction bottle was placed a solution of 10 parts 4-(2,4-di-tert-amylphenoxy)-m-dinitrobenzene in 150 volumes of dioxane. To this solution was added one part of Raney nickel catalyst, and the bottle was placed on the Parr hydrogenation shaker. The hydrogen pressure was brought up to 50 lb. and the reduction was complete in approximately 1 hour. The reaction mixture was filtered and the filtrate was used as such without isolating the amine.

4 - (2,4 - DI - TERT - AMYLPHENOXY) - 1,3 - PHENYLENE - BIS-(3-CARBAMYLBENZENESULFONYL CHLORIDE)

To a solution of 1 part of 4-(2,4-di-tert-amylphenoxy)-m-phenylenediamine and 1.5 parts of quinoline in 18 volumes of dioxane was added with stirring at 26° C. 1.4 parts of m-chlorosulfonylbenzoyl chloride in 2.4 volumes of dioxane. The temperature rose rapidly to 35° C. and the mixture was left standing at room temperature overnight. The mixture was drowned in 60 volumes of water and 3 volumes of concentrated hydrochloric acid, and the oil which separated was isolated as a solid by dissolving it in ether and drowning this solution in petroleum ether. The product was collected and dried.

Compound VIII, 6-[5-(m-chlorosulfonylbenzamido)-2-(2,4 - di - tert -amylphenoxy)benzamido] - 2,4-dichloro-3-methylphenol, was prepared as follows:

In a 200-ml. 3-necked round bottom flask, equipped with a thermometer and stirrer, is placed a solution of 10.86 g. (0.02 mole) of 6-[5-amino-2-(2,4-di-tert-amylphenoxy)-benzamido]-2,4-di-chloro-3-methylphenol (prepared for compound II above) and 2.8 g. (0.022 mole) of quinoline in 100 ml. of dry dioxane. To the solution is added, with stirring, 5.26 g. (0.022 mole) of m-chlorosulfonylbenzoyl chloride. The temperature of the reaction mixture rises to 34° C., accompanied by the separation of a white solid. The reaction mixture is stirred for one hour, after which a solution of 50 ml. of concentrated hydrochloric acid and 450 ml. of water is added, and the product separates as a gum.

This gum is triturated in 100 ml. of glacial acetic acid and the mixture left standing overnight. The crystalline product is filtered off, washed on the funnel with water, and dried.

Th yield is 13 g. (87.5%), M. P.: molten 129° C. This molten substance resolidifies, and remelts at 190° C.

The following compounds further illustrate the lower molecular weight sulfonated compounds which do mordant basic dyes but which do not appreciably enhance the stability of the dyes in organic colloid layers:

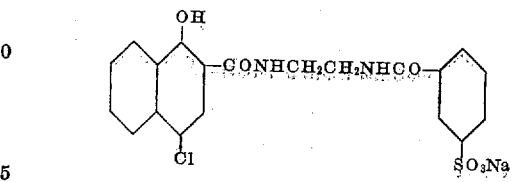

and

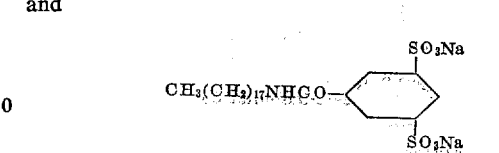

The following dyes are illustrative of the basic dyes useful with the above mordant compounds of the invention to produce stable non-diffusing dye images in light-insensitive hydrophilic organic colloid layers containing the mordant compounds.

| | |
|---|---|
| Acridine Yellow | Color Index 785 |
| Auramine G | Color Index 656 |
| Auramine O | Color Index 655 |
| Capriblau GON | Color Index 876 |
| Chrysoidine Y | Color Index 20 |
| Methylene Blue GX | Color Index 922 |
| New Fast Green 2B | Color Index 659 |
| Rhoduline Blue 6GA | Color Index 658 |
| Thioflavine T | Color Index 815 |
| Malachite Green | Color Index 657 |
| Acriflavine | Color Index 790 |
| Astraphloxine FF | Schultz-Lehmann 930 |

The basic dyes useful with the mordant compounds of the invention in insensitive bleachable filter layers of films as described in the examples hereinafter, include bleachable azo dyes such as Chrysoidine Y above, bleachable basic triphenylmethane dyes free from substituents ortho to the central carbon atoms and bleachable basic styryl dyes.

The benzoxazole-pyrrole-methine basic dyes are particularly useful with the mordant compounds of the invention in filter layers of color films and have the general formula

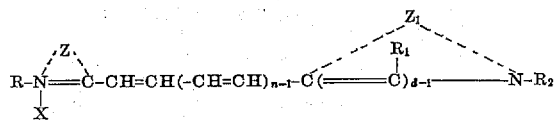

wherein X represents a halogen atom such as chlorine or iodine, R and $R_1$ represent alkyl groups of from 1 to 4 carbon atoms such as methyl, ethyl, n-propyl, n-butyl, Z represents the atoms necessary to complete a benzoxazole nucleus, $n$ and $d$ represent positive integers of from 1 to 2, $Z_1$ represents the atoms necessary to complete a pyrrole nucleus, and $R_2$ represents either an alkyl group such as methyl, ethyl, n-propyl, n-butyl, hexyl, lauryl, cetyl, or a monocyclic aryl group of the benzene series such as phenyl, o-tolyl, and 2,4-di-tert. amylphenyl etc.

Typical dyes useful in our invention and having the above general formula are as follows:

IX
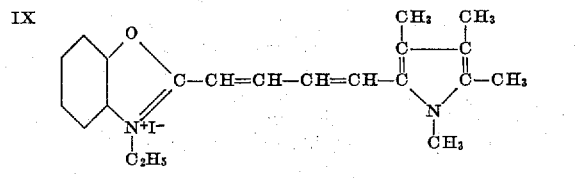
(1,3,4,5-tetramethyl-2-pyrrole)-(3-ethyl-2-benzoxazole)-tetramethine cyanine iodide X
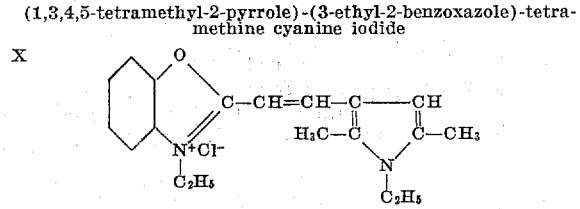
(1-ethyl-2,5-dimethyl-3-pyrrole)-(3-ethyl-2-benzoxazole) dimethine cyanine chloride XI
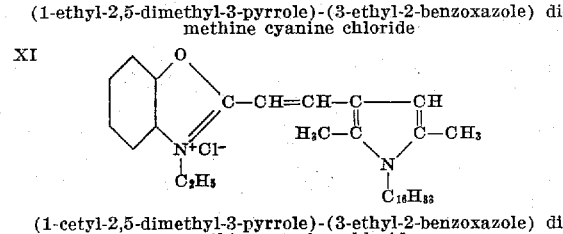
(1-cetyl-2,5-dimethyl-3-pyrrole)-(3-ethyl-2-benzoxazole) dimethine cyanine chloride The two latter dyes are representative of useful dyes prepared as described in U. S. Patent 2,409,612. Dye IX is prepared as follows:

A mixture of 3.6 g. of 2-(4-methoxy-1,3-butadienyl)-benzoxazole ethiodide and 2.0 g. of 1,3,4,5-tetramethyl-pyrrole in 20 ml. of acetic anhydride was heated at the refluxing temperature for five minutes. After chilling, the reaction mixture was filtered and the residue was washed first with acetone and then with water. The yield was 78 percent crude and 49 percent after two recrystallizations from methyl alcohol. The green crystals melted at 241–242° C. with decomposition.

*Example 1*

Forty-five mg. compound I (as the disulfonylchloride) was hydrolyzed by boiling in 0.1 cc. 20% sodium hydroxide+1 cc. ethyl alcohol+1 cc. water until dissolved. This was added to 25 cc. 5% gelatin at 40° C.

2.5 cc. 2% dye XI in methanol was added to 25 cc. 5% gelatin at 40° C. To this was added the above mordant solution and the total adjusted to pH 5.5 with dilute sulfuric acid and dilute sodium hydroxide. A sample was coated on glass at 26 cc. per sq. ft.

When dry, this coating underwent a loss of 14% in the maximum optical density during one week at 100° F. and 78% R. H. It bleached readily in a common film developer.

Another coating was made as above at the same pH, dye/gelatin ratio, and coating thickness but omitting compound I. Under the same incubation conditions the loss in maximum density was 99%.

*Example 2*

One hundred mg. dye IX was boiled in 3.0 cc. pyridine and diluted to 10 cc. with water. 2.8 cc. of this solution was added to 25 cc. 5% gelatin at 40° C.

30 mg. compound I (as the acid halide) was dissolved in a solution of 0.10 cc. 20% sodium hydroxide and 1.0 cc. ethanol. This was added to 25 cc. 5% gelatin at 40° C.

The second solution above at 40° C. was added to the first solution at 40° C. and the pH adjusted to 5.5 with sodium hydroxide and sulfuric acid.

A coating of the final dispersion was made on a glass plate and after drying, a sample of this coating was incubated for one week at 78% relative humidity and 100° F. with the result that it was found that the maximum optical density had decreased only 14%, whereas a comparable coating of the same dye incubated under the some conditions decreased 39% in maximum optical density.

*Example 3*

155 mg. compound I (as the acid halide) was dissolved in a solution of 0.23 cc. 20% sodium hydroxide and 1.6 cc. ethanol by boiling. The solution was cooled and 1 cc. water added followed by 0.06 cc. conc. hydrochloric acid. This solution was added to 25 cc. 5% gelatin at pH 5.5 and 40° C. and the pH readusted to 5.5.

126 mg. dye X was dissolved in 3 cc. water at 60° C. and at 60° C. this solution was added to the above solution at 40° C. The whole was diluted with water to 36 cc.

One cc. of the final dispersion was mixed with 2 cc. of 5% gelatin solution at pH 5.5 and 3 cc. of water was added. The resulting solution was coated onto a glass plate and a sample of this coating was carried through a process including 4 minutes in a negative developer, then 4 minutes in a fixing solution and 4 minutes wash in cold running water with the result that the dye was bleached cleanly from the layer.

A sample of the coating made on the glass plate was incubated under the above conditions and was found to decrease 34% in maximum optical density, whereas a comparable coating of the same dye alone experienced a loss of 75% in maximum optical density.

*Example 4*

Fifty mg. of dye XI was dissolved in 2.5 cc. of methanol and this was added to 25 cc. of a 5% gelatin solution at 40° C.

Fifty-nine mg. of compound III as the acid halide was boiled in a solution of 2 cc. of ethyl alcohol and 0.2 cc. of 20% sodium hydroxide and when the solution was clear it was added to 25 cc. of 5% gelatin solution at 40° C. The second solution was added to the first at 40° C. and the pH adjusted to 5.5. A coating of this dispersion was incubated as above and sustained a 15% loss in maximum optical density, whereas a comparable coating of the same dye alone underwent a 99% decrease in maximum optical density.

*Example 5*

When the procedure of Example 4 was repeated, using 95 mg. of compound IV in place of compound III, the loss of maximum optical density was 48%.

*Example 6*

A receiving sheet is prepared as follows:

13.0 g. 5-(4-(2,4-di-tert-amylphenoxy)-3-(2-hydroxy-3,5-dichloro-4-methylphenylcarbamyl)phenylcarbamyl)-1,3-benzene disulfonyl chloride (acid halide of compound II) was hydrolyzed by boiling 5 minutes in a solution of 15 cc. of 20% sodium hydroxide and 50 cc. of ethyl alcohol.

The solution for coating was prepared by adding the above to a solution of 40 g. gelatin, 0.6 g. saponin (spreading agent), 0.3 g. mucochloric acid (hardening agent), and 690 g. water.

The final solution was coated on a film base of cellulose acetate at 1 lb. dry gelatin per 600 sq. ft.

A silver image in gelatin on film base was bleached 2 minutes in 1% potassium iodide—1% potassium ferricyanide solution in water to produce a silver iodide image. After washing in running water 2 minutes, the sample was bathed 2 minutes in a water solution containing 0.25% Malachite Green, 1% acetic acid, 12% ethanol, and 0.05% potassium iodide. A 3-minute wash in running water followed, leaving an image consisting of dye adsorbed to silver iodide.

The receiving sheet (mordanted blank prepared above) was conditioned by treating first 2 minutes in a hardening bath consisting of 0.5 g. sodium hexametaphosphate, 5.0 g. sodium bisulfite, 5.0 g. sodium carbonate monohydrate, 1.0 g. potassium bromide, 150 g. sodium sulfate and 20 cc. formalin (40%) made up to one liter with water. This was followed by a 1-minute water wash and a 3-minute bath in 0.1 N silver nitrate in 1% acetic acid.

The wet image sample of dye absorbed on silver iodide was rolled into contact with the wet, treated receiving sheet and after 2 minutes removed. The receiving sheet, containing the transferred image was washed in running water 1 minute and dried.

It was observed that all the dye had transferred and that the final image had appreciably better definition than images obtained similarly using other classes of previously known non-diffusing acid mordants in the receiving sheet.

*Example 7*

0.5 g. of compound IV as the acid halide was dissolved in a solution of 2 cc. of ethyl alcohol and 0.3 cc. of 20% sodium hydroxide solution by boiling for 5 minutes. This solution was diluted to 15 cc. with water and then added to 15 cc. of 10% gelatin solution at 40° C. Two cc. of this solution were then diluted with 2 cc. of water and the whole coated on a glass plate.

A Malachite Green dye image was prepared as in Example 6 and transferred to the coating above containing compound IV, which coating had been conditioned as in Example 6, with the result that the transferred dye image was mordanted in the coating.

*Example 8*

100 mg. of compound V was dissolved in a solution of 1 cc. of ethyl alcohol and 0.2 cc. of 20% sodium hydroxide solution by boiling. 1 cc. of water followed by 0.06 cc. of acetic acid was then added. This solution was then added to 3 cc. of 10% gelatin solution at 40° C. and diluted with water to 6 cc. The solution was then coated onto a glass plate. The coating was then conditioned as was the receiving sheet in Example 6 and the Malachite Green dye image of Example 6 was completely transferred thereto to obtain a mordanted dye image of good definition.

*Example 9*

Dye images were absorbed on silver iodide as described in Example 6 except using the following dyes in place of Malachite Green:

Rhoduline Blue 6GA
Methylene Blue ZX
Capriblau GON

The dye images were then transferred separately with good definition to the coating of Example 6 containing compound II as the mordant.

A particularly valuable usage for the mordants of the invention is in those photographic elements requiring integral filter layers or anti-halation layers and particularly where colloidal silver or yellow dyes have previously been used for light filtering purposes. For example, in a conventional multilayer color film, having red, green and blue light-sensitive silver halide emulsion layers which may contain coupler compounds for color development of dye images of color complementary to the sensitivity, to obtain color separation the blue-sensitive layer may be separated from the other layers by means of a layer containing a basic yellow dye such as compounds IX, X or XI mordanted in the layer by means of one of the above mordants such as compounds I, V, VI, VII and IX. When the film is subjected to the usual processing steps including color development, silver bleaching and fixation steps, the yellow dye of the filter layer is readily removed and in some cases the color of the filter layer is removed more readily than when a colloidal silver filter layer has been employed. A particularly good combination of dye and mordant in a filter layer of such films is that of dye XI with mordant VI. Thus, as shown in Example 1, mordant VI as the acid halide is hydrolyzed with aqueous alkali then added to a gelatin solution at about 40° C. Dye XI is dissolved in methanol and added to a gelatin solution. The mordant solution is then mixed with the dye solution and after addition of mucochloric acid hardener and saponin spreading agent the mixture is coated as an interlayer between the blue-sensitive and the other layers of the color film so as to obtain about 40 mg. dye XI 21.6 mg. compound VI and 255 mg. of gelatin per sq. ft. of coating surface. Similar proportions of the other dyes and mordants can be used for coating filter and antihalation layers on light-sensitive films.

Similarly, in multilayer color film designed for recording both sound and picture images, it is a distinct advantage to use in place of a yellow colloidal silver filter layer a layer of a yellow basic dye, such as IX, X or XI mentioned above, mordanted in the filter layer by means of the mordant compounds such as V, VI, VII and IX of the invention. Thus, during processing of the sound and picture images in the film, the filter dye is readily decolorized in the sound area and there is no problem of removing colloidal silver from the sound track area as is usually necessary when a colloidal silver filter layer has been employed in such a film.

Another application of the mordant compounds of the invention is in the fixing of yellow filter dyes, such as those given above, in an organic colloid layer of a color film designed for reversal processing by a silver halide solvent transfer process such as described in U. S. Patent 2,673,800, granted March 30, 1954. Thus, since there is no colloidal silver present in the filter layer, there are no precipitating silver nuclei present to cause contamination from precipitation in the filter layer of soluble silver salts during the solvent transfer step.

It will be apparent that since the dye mordant compounds such as II, III, IV and VIII are cyan-forming coupler compounds, they find limited use for mordanting dyes in filter layers in multilayer color films unless the layers are carefully insulated from adjacent emulsion layers in which dye images are to be produced by color development using other coupler compounds. However, compounds analogous to compounds II, III, IV and VIII, which possess no such limitation, are readily prepared by the methods described by merely replacing the phenol groups of those compounds by the same nuclei free of hydroxyl groups. On the other hand the basic dyes such as those mentioned may be mordanted into an emulsion layer of a multilayer film by means of the mordants having a coupling function. The resulting colored layer may be used both for its light filtering and dye image forming properties by so positioning the layer in the film that by virtue of its color such as yellow it serves as a color separation filter during exposure of adjacent emulsion layers. At the same time since the mordant has a coupling function a dye image can be developed in the emulsion layer and thereafter the residual mordanted dye can be decolorized in the usual bleaching and fixing solutions leaving a dye image in the layer.

It will be apparent that since the compounds such as II, III, IV and VIII possess a coupling function they can be used in color development processes independent of their mordanting properties, for the formation of color developed dye images. They are especially valuable in this usage because of their non-diffusing properties.

Accordingly, the compounds are conveniently incorporated into a hydrophilic organic colloid layer of a film such as a gelatino-silver halide emulsion layer to serve as cyan forming coupler compounds in well-known color development processes in which the oxidation products of a primary aromatic amino silver halide developing agent combine with these compounds to form dye images in the emulsion layer.

What we claim is:

1. A photographic element comprising a support carrying a hydrophilic organic colloid layer containing a basic dye mordanted in said layer by means of a compound having the general formula

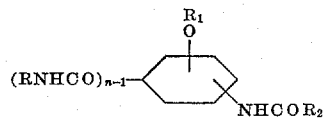

wherein $n$ represents a positive integer of from 1 to 2, R and $R_1$ represent monocyclic aryl groups of the benzene series one of which contains an alkyl group of at least 5 carbon atoms, and $R_2$ represents a member of the class consisting of alkali metal and ammonium monocyclic sulfoaryl and carboxyaryl groups of the benzene series.

2. The element of claim 1 wherein the basic dye is one having the general formula

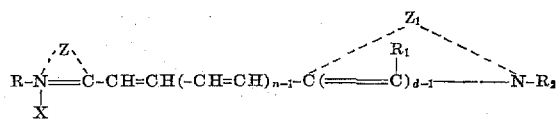

wherein X represents a halogen atom, R and $R_1$ represent alkyl groups of from 1 to 4 carbon atoms, Z represents the atoms necessary to complete a benzoxazole nucleus, $n$ and $d$ each represent positive integers from 1 to 2, $Z_1$ represents the atoms necessary to complete a pyrrole nucleus and $R_2$ represents a member of the class consisting of alkyl and monocyclic aryl groups of the benzene series.

3. A photographic element comprising a support carrying a hydrophilic organic colloid layer containing a basic dye mordanted in said layer by means of an alkali metal salt of 5-[4-(2,4-di-tert-amylphenoxy-3-(phenylcarbamyl) phenylcarbamyl] - 1,3 - benzene-disulfonic acid.

4. A photographic element comprising a support carrying a hydrophilic organic colloid layer containing a basic dye mordanted in said layer by means of an alkali metal salt of 2,4-dichloro-3-methyl-6-[2'-(2'',4''-diamylphenoxy) - 5 - (3'', 5'' - disulfobenzamido)] - benzamidophenol.

5. A photographic element comprising a support carrying a hydrophilic organic colloid layer containing a basic dye mordanted in said layer by means of an alkali metal salt of 1-hydroxy-4-chloro-N-(4-(2-(2,4-diamylphenoxy) - 5 - (3,5-disulfobenzamido) - benzamido)-phenethyl)-2-naphthamide.

6. A photographic element comprising a support carrying a hydrophilic organic colloid layer containing a basic dye mordanted in said layer by means of an alkali metal salt of 6-[2-(2,4-di-tert-amylphenoxy)-5-α-(3,5-dicarboxyphenoxyacetamido)benzamido]-2,4 - dichloro-3-methylphenol.

7. A photographic element comprising a support carrying a hydrophilic organic colloid layer containing a basic dye mordanted in said layer by means of an alkali metal salt of 5 - [4 - (2,4 - di - tert-amylphenoxy) phenylcarbamyl]-1,3-benzenedisulfonic acid.

8. The element of claim 1 wherein the basic dye is (1,3,4,5 - tetramethyl - 2-pyrrole) - (3 - ethyl - 2 - benzoxazole)-tetramethine cyanine iodide.

9. The element of claim 1 wherein the basic dye is (1 - ethyl - 2,5 - dimethyl - 3 - pyrrole) - (3 - ethyl-2-benzoxazole) dimethine cyanine chloride.

10. The element of claim 1 wherein the basic dye is (1 - cetyl - 2,5 - dimethyl - 3 - pyrrole) - (3 - ethyl-2-benzoxazole) dimethine cyanine chloride.

11. A photographic element comprising a support carrying a hydrophilic organic colloid layer containing the dye (1-cetyl-2,5-dimethyl-3-pyrrole)-(3-ethyl-2-benzoxazole) dimethine cyanine chloride mordanted in said layer by means of an alkali metal salt of 5-[4-(2,4-di-tert-amylphenoxy) - 3 - (phenylcarbamyl) phenylcarbamyl]-1,3-benzenedisulfonic acid.

12. A photographic element comprising a support carrying a hydrophilic organic colloid layer containing the dye (1,3,4,5 - tetramethyl-2-pyrrole)-(3-ethyl-2-benzoxazole)-tetramethine cyanine iodide mordanted in said layer by means of an alkali metal salt of 5-[4-(2,4-di-tert-amylphenoxy)-3-(phenylcarbamyl) phenylcarbamyl]-1,3-benzenedisulfonic acid.

13. A photographic element comprising a support carrying a hydrophilic organic colloid layer containing the dye (1-ethyl-2,5-dimethyl-3-pyrrole)-(3-ethyl-2-benzoxazole) dimethine cyanine chloride mordanted in said layer by means of an alkali metal salt of 5-[4-(2,4-di-tert-amylphenoxy)-3-(phenylcarbamyl) phenylcarbamyl]-1,3-benzenedisulfonic acid.

14. A photographic element comprising a support carrying a hydrophilic organic colloid layer containing the dye (1-cetyl-2,5-dimethyl - 3 - pyrrole)-(3-ethyl-2-benzoxazole) dimethine cyanine chloride mordanted in said layer by means of an alkali metal salt of 1-hydroxy-4-chloro-N-(4-(2-(2,4-diamylphenoxy) - 5-(3,5-disulfobenzamido)-benzamido)-phenethyl)-2-naphthamide.

15. A photographic element comprising a support carrying a hydrophilic organic colloid layer containing the dye (1-cetyl-2,5-dimethyl-3-pyrrole)-(3-ethyl-2-benzoxazole) dimethine cyanine chloride mordanted in said layer by means of an alkali metal salt of 6-[2-(2,4-di-tert-amylphenoxy) - 5 - α-(3,5-dicarboxyphenoxyacetamido)-benzamido]-2,4-dichloro-3-methylphenol.

16. A photographic element comprising a support carrying a hydrophilic organic colloid layer containing the dye (1-cetyl-2,5-dimethyl-3-pyrrole)-(3-ethyl-2-benzoxazole) dimethine cyanine chloride mordanted in said layer by means of an alkali metal salt of 5-[2-(2,4-di-tertamylphenoxy) phenylcarbamyl] - 1,3 - benzenedisulfonic acid.

17. A photographic element comprising a support having thereon a hydrophilic organic colloid layer containing an alkali metal salt of the compound 2,4-dichloro-3-methyl - 6 - [2' - (2'',4'' - diamylphenoxy)-5-(3'',5''-disulfobenzamido)]-benzamidophenol.

18. A photographic element comprising a support having thereon a hydrophilic organic colloid layer containing an alkali metal salt of the compound 1-hydroxy-4-chloro - N - (4-(2-(2,4-diamylphenoxy)-5-(3,5-disulfobenzamido)-benzamido)-phenethyl)-2-naphthamide.

19. A photographic element comprising a support carrying a light-insensitive hydrophilic organic colloid layer containing a water-soluble salt of a compound having the general formula

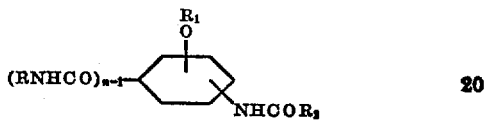

wherein $n$ represents a positive integer of from 1 to 2, $R$ and $R_1$ represent monocyclic aryl groups of the benzene series one of which contains an alkyl group of at least 5 carbon atoms, and $R_2$ represents a member of the class consisting of monocyclic sulfoaryl and carboxyaryl groups of the benzene series.

References Cited in the file of this patent

UNITED STATES PATENTS 2,078,398    Mannes et al. _____ Apr. 27, 1937